Jan. 4, 1966 G. E. McLEAN 3,227,807

MULTI-ZONE METERING

Filed Dec. 10, 1962 6 Sheets-Sheet 1

INVENTOR.
GEORGE E. Mc LEAN
BY C A Gulbrandsen
ATTY.

MULTI-ZONE METERING

Filed Dec. 10, 1962 6 Sheets-Sheet 2

United States Patent Office 3,227,807 Patented Jan. 4, 1966

3,227,807
MULTI-ZONE METERING

George Edward McLean, Elk Grove Village, Ill., assignor to Automatic Electric Laboratories, Inc., Northlake, Ill., a corporation of Delaware
Filed Dec. 10, 1962, Ser. No. 243,520
3 Claims. (Cl. 179—7.1)

The present invention relates to a circuit arrangement for metering variously rated calls in telephone communication systems.

With the Europeon system of charging whereby, tariffs are based on, and determined by, the length of conversation (time) and the distance between the calling and called zones. Metering takes place one unit at a time, at the beginning of the call and at frequent intervals while the call is in progress. The meter's rate of repetition is proportional to the base rate for the call.

The object of the invention is to enable the metering of such calls to proceed automatically.

Another object is to provide a discriminating circuit capable of determining the frequency of pulses to be sent to the subscriber's meter.

Still another object of the invention is to provide a trunk circuit to send the appropriate pulse as determined by the discriminating circuit.

The foregoing and other objects and features of the present invention may be more readily understood from the following description of an illustrative embodiment thereof when read with reference to the attached drawings in which:

FIGS. 1, 2, 5 and 6 illustrate the repeater circuit in schematic form, FIG. 1 also shows a portion of the local exchange while FIG. 2 shows a foreign exchange as a trunk connected block.

GENERAL

Figure 1:
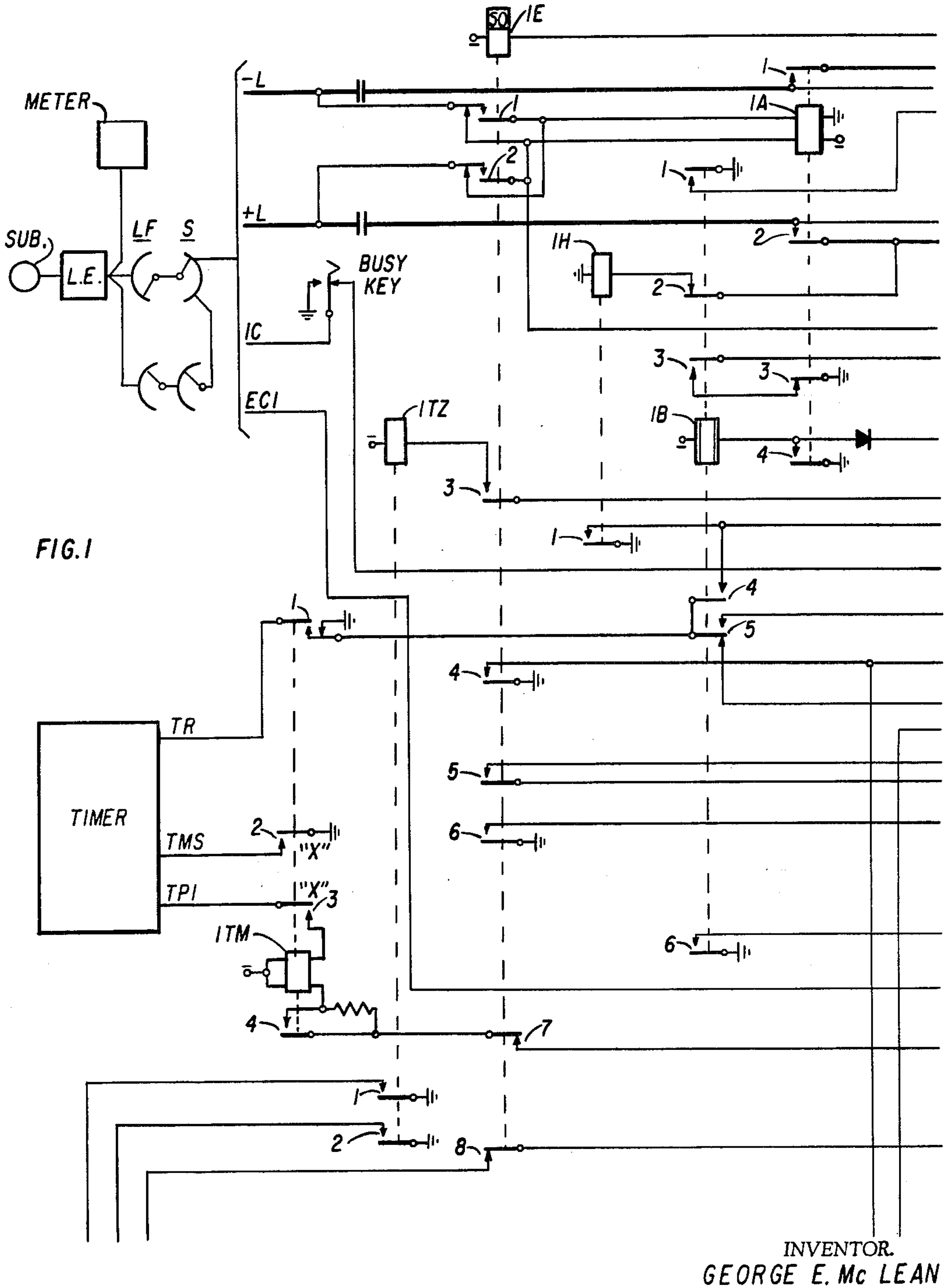
Figure 2:
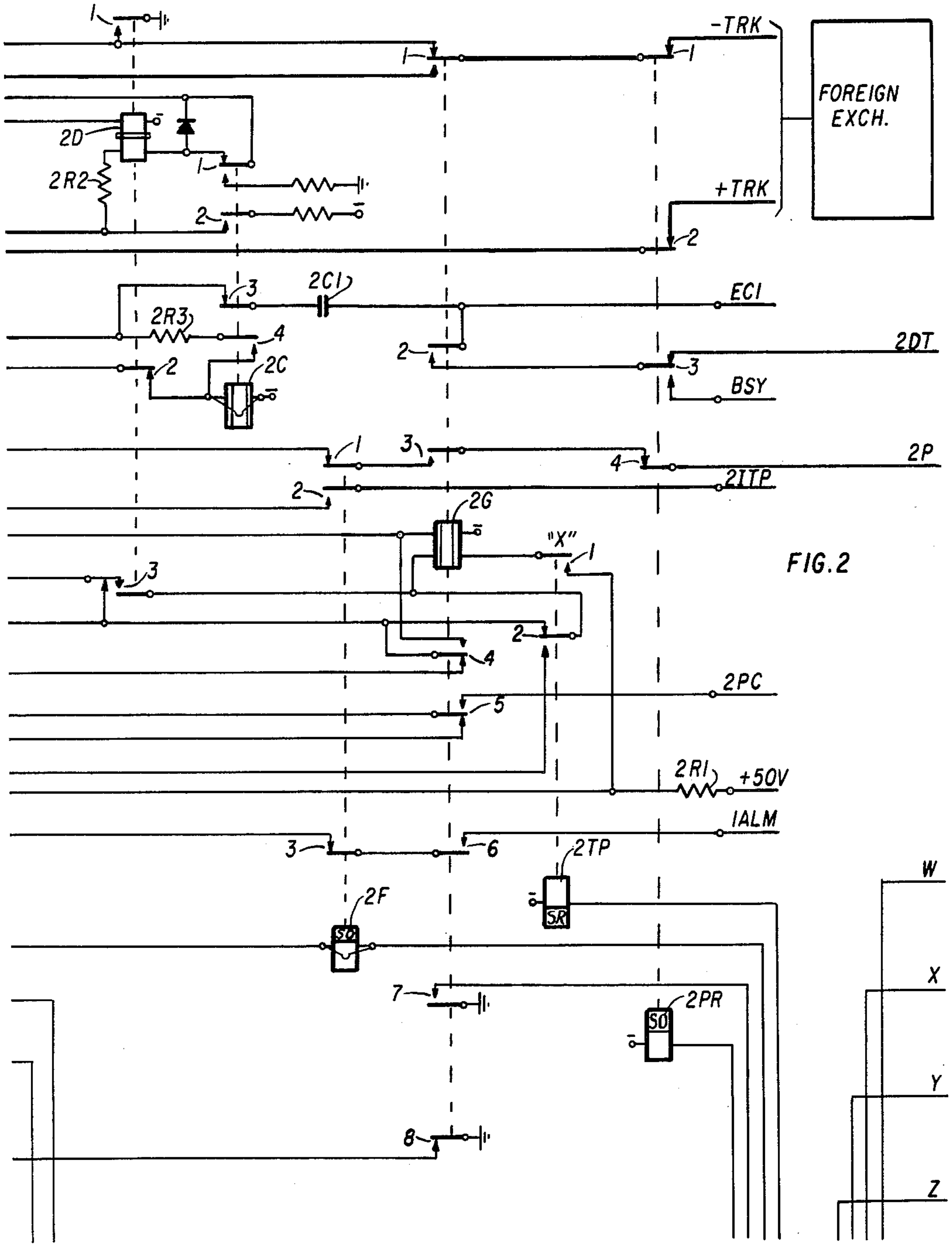

The present invention may be embodied in any automatic telephone system, though it was intended for installation in a Strowger type step by step exchange. Wherein the subscriber equipment is equipped with a dial arranged to interrupt the line loop whereby the local switching equipment may be controlled to access the repeater circuit of this invention in much the same manner as another subscriber within the exchange. The ensuing digits dialed by the subscriber after access of the repeater, and used to control equipment in the connecting exchange are also repeated to a discriminating circuit. The discriminating circuit basically consists of a Strowger type two motion switch the banks of which are strapped with an appropriate code for each dialed code. Upon completed receipt of the required digits the code from the strapped banks is returned to the repeater circuit where it is stored as operated relays corresponding to the code. The repeater circuit upon completion of the connection initiates a rotary switch contained within itself into operation at a rate determined by a master pulsing source. However, the pulses to operate the subscriber meter for charging purposes are sent from the rotary switch banks.

These rotary switch banks are selectively strapped to send a pulse at the requisite frequency by the code relays operated from the discriminator switch.

REPEATER SEIZURE

This circuit is marked idle by absence of ground on lead 1C. Upon seizure, a loop is closed via leads +1L and —1L to both windings of relay 1A. Relay 1A operates and closes a circuit at contacts 1A4 to relay 1B. Relay 1B operates, closes a circuit to the number two winding of relay 2D at contacts 1B1 and to the number one winding of relay 2G at contacts 1B4 and grounds lead 1C at contacts 1B5 to hold preceding equipment and to mark this circuit busy. Relay 2G operates, locks to lead 1C, completes the loop at contacts 2G1 across leads +2TRK and —2TRK via the number one winding of relay 2D to seize the incoming switch associated with this trunk at the distant end, ground lead 2P to operate relay 3A in the register circuit, closes lead 2DT to lead —1L via capacitor 2C1 to extend dial tone to the calling part when the register circuit has been seized and is ready to receive the subscriber's dialed digits, and opens lead 5ATB for a possible all trunks busy registration. Relay 2D does not operate at this time because its windings are closed in magnetic opposition.

*Pulsing (operated: relays 1A, 1B, 2G)*

Relay 1A follows the pulses, and when at normal, opens the trunk loop to the succeeding switch, opens the circuit to relay 1B, removes ground from lead 2P, and closes the circuit to relay 2C. Relay 2C operates, closes a pre-energizing circuit to the number one winding of relay 1A via resistor 2R3, and opens lead 2DT to remove dial tone from the calling party's line. At the completion of each pulse, relay 1A reoperates, and recloses a circuit to relay 1B, grounds lead 2P, opens the circuit of relay 2C, and connects lead —2TRK to resistance ground and lead +2TRK to resistance battery. Relays 1B and 2C remain operated during pulsing due to their slow to release characteristics.

At the completion of each digit, relay 2C restores and transfers the loop circuit to the number one winding of relay 2D.

*Destination code marking (operated: relays 1A, 1B, and 2G)*

After the destination code digits have been dialed and translated by the register circuit, the codel code marking is extended to this circuit via leads 3W, 3X, 3Y, and 3Z to operate their respective relays 6W, 6X, 6Y and 6Z. One or a combination of two of the relays 6W, 6X, 6Y and 6Z operates, locks via its number two winding from ground through relay 2F, and closes LEV.'s D and E of ROT. SW. 5TPS to relay 2TP. After its slow to operate interval, relay 2F operates, and opens the continuity of lead 2P to release the register circuit.

*Answer supervision (operated: relays 1A, 1B, 2F, 2G, and 6W, 6X, 6Y, or 6Z)*

When the called party answers, battery polarity is reversed through the number one winding of relay 2D. Relay 2D operates, closes a circuit at contacts 2D1 to relay 1E, and opens the path to 2C to prevent it from operating should additional pulses be received. After its slow to operate interval, relay 1E operates, reverses battery polarity over the calling loop, and closes lead 2ITP to release TZ.

*Timing the call operated: relays 1A, 1B 1E, 2D, 2F, 2G, and 6W, 6X, 6Y, or 6Z)*

Every five seconds, ground pulses are sent over leads 2ITP from the time pulse source to relay 1TZ. Relay 1TZ follows the pulses, and when operated, closes a circuit from ground at contacts 1T22 to rotary switch 5TPS, grounds the D and E wipers and closes a circuit to relay 2TP from bank contact N, level E. 5TPS operates and opens its interrupter springs 5TPS3. When the pulse is removed from lead 2ITP, relay 1TZ restores and opens the circuit to the motor magnet of 5TPS and relay 2TP. Switch 5TPS restores, steps its wipers one step, and, on the first pulse only, restores its rotary off normal springs 5TPS1 and 5TPS2 and tranfers the control of relay 2TP to its wipers.

If for example, code relays 6Y and 6Z are closed after translation from the register circuit, ground is closed to relay 2TP on the first pulse via level E and thereafter, via level D every 45 seconds or every ninth step. Relay 2TP operates its "X" contacts 2TP1, closes +50V. booster battery via resistor 2R1 and the number two winding of relay 2G to lead 1C, operates completely, and short circuits the second winding of relay 2G to operate the calling party's register meter. When the associated level D wiper steps to the next bank contact, the circuit to relay 2TP is opened. After its slow to release interval, relay 2TP restores and replaces the +50V. booster battery with direct ground on lead 1C. This also occurs when switch 5TPS steps to bank contacts 18 and 26. After 180 seconds, rotary switch 5TPS steps its wipers to bank contact number 35 and closes its "homing" circuit via level C and its interrupter springs. Rotary switch 5TPS "homes" self-interruptedly and operates its rotary off normal springs.

*Release operated: relays 1E, 1B, 1A, 2D, 2F, 2G, and 6W, 6X, 6Y, or 6Z, and possibly 1TZ and 2TP)*

When the calling party disconnects, the loop to leads +1L and −1L is opened, opening the circuit of relay 1A. Relay 1A restores, opens the circuit of relay 1B, and opens the loop across leads +2TRK and −2TRK, opening the circuit to the first winding of relay 2D. After its slow to release interval, relay 1B restores, opens the circuit to the first winding of relay 2G, second winding of relay 2D, winding of relay 2F, and 6W, 6X, 6Y, or 6Z, removes ground from lead 1C to release preceding equipment and to mark this circuit idle, and grounds lead 2PC. Relay 2D restores and opens the circuit of relay 1E. After its slow to release interval, relay 2G restores, closes the "homing" circuit of switch 5TPS via levels A and B and its interrupter springs, and opens lead 2IPC for a possible peg count registration. Relays 6W, 6X, 6Y, or 6Z restore and open the circuit of relay 2TP. Relay 2F restores and opens lead 2ITP from relay 1TZ. Relay 1TZ restores (if operated) closes a circuit to switch 5TPS and removes ground from its level's D and E wipers. Rotary switch 5TPS steps self-interruptedly to its "home position" and operates its rotary off normal springs. Relay 2TP restores (if operated) after its slow to release interval. Relay 1E restores, returns battery polarity on leads +1L and −1L to normal, and grounds lead 5ATB at contacts 1E8. This circuit is now at normal.

BUSY BACK FACILITIES

When the succeeding trunk is busied out, ground is returned on −2TRK, closing an operating path to relay 1E. Relay 1E operates, reverses battery polarity to leads +1L and −1L, and grounds lead 1C, and opens lead 5ATB for a possible all trunks busy registration. In this manner, this circuit is marked busy and cannot be seized. When the distant office releases, ground is removed from lead −2TRK. Relay 2E restores, and the circuit is at normal.

*Alarm condition (operated: relays 1A, 1B, and 2G)*

If this circuit fails to obtain a marking from the register circuit, relay 2F does not operate. When the calling party answers, relay 1E operates and closes ground to lead 1ALM.

NIGHT RATE

A special night rate is provided for night and holiday calls. Pulses are received over lead 2ITP from the time pulse source every ten seconds, thus twice the time is required for stepping rotary switch 5TPS reducing the regular day rate to half.

PAYSTATION RESTRICTION

When this circuit is seized by a paystation, the loop is closed to relay 1A and ground is closed to lead ED. After the digits have been translated in the Register, relays 6W, 6X, or 6Y operate (Regular Call) or 6Z (Special Service Call—dotted strap used) operates and close a circuit to relay 2PR. After its slow to operate interval, relay 2PR operates, closes busy tone lead 2BSY to the calling party, opens lead 2P to drop the register circuit, and opens leads +2TRK and −2TRK to release succeeding equipment.

NO CODE

When the calling party dials a number which is unassigned or is a non-working Central Office code, relays 6W, 6X, and 6Y operate and close a circuit to relay 2PR. Relay 2PR operates as described in the preceding section.

REGISTER SEIZURE

Figure 3:
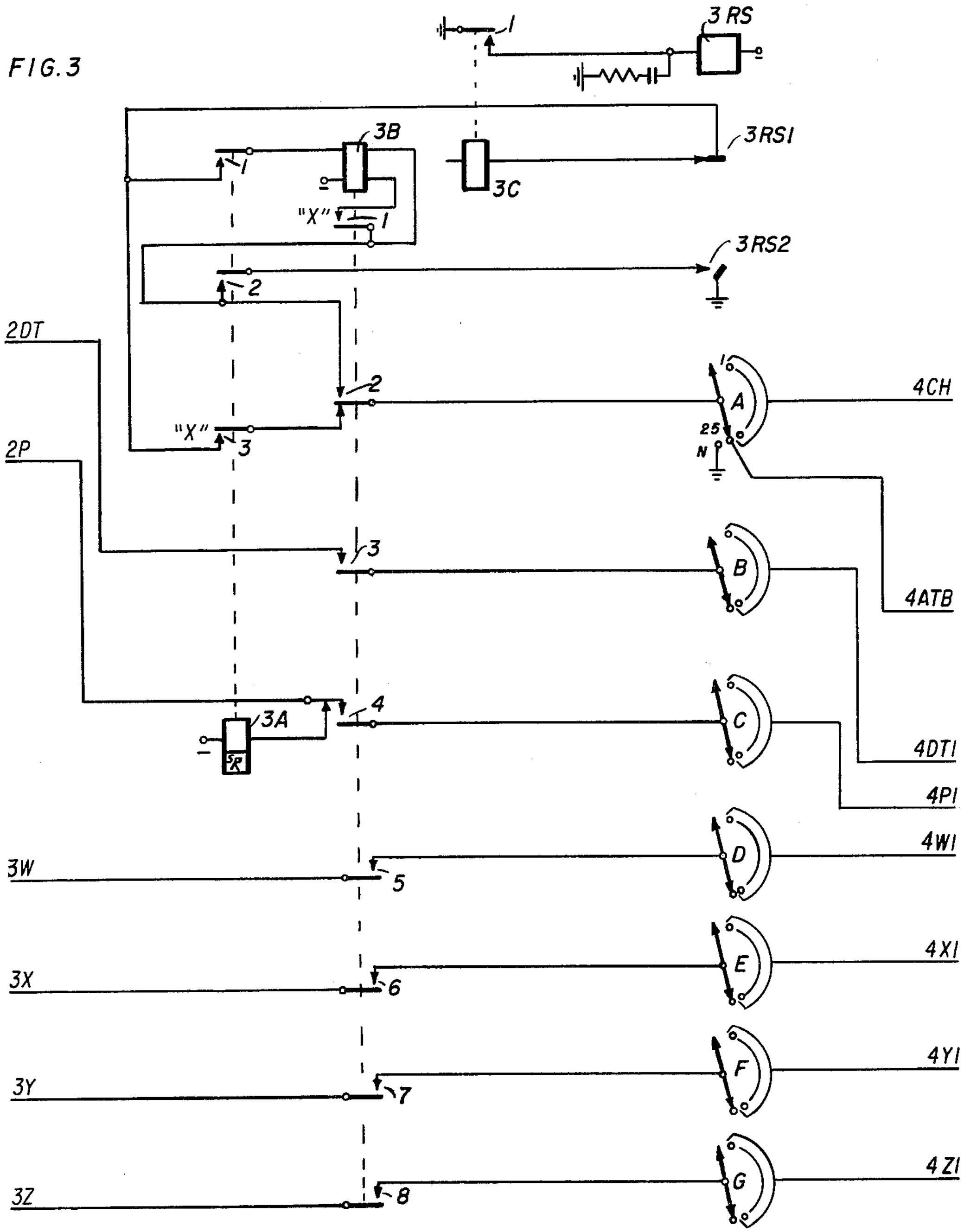
FIG. 3 illustrates the discriminator allotter circuit.
Figure 4:
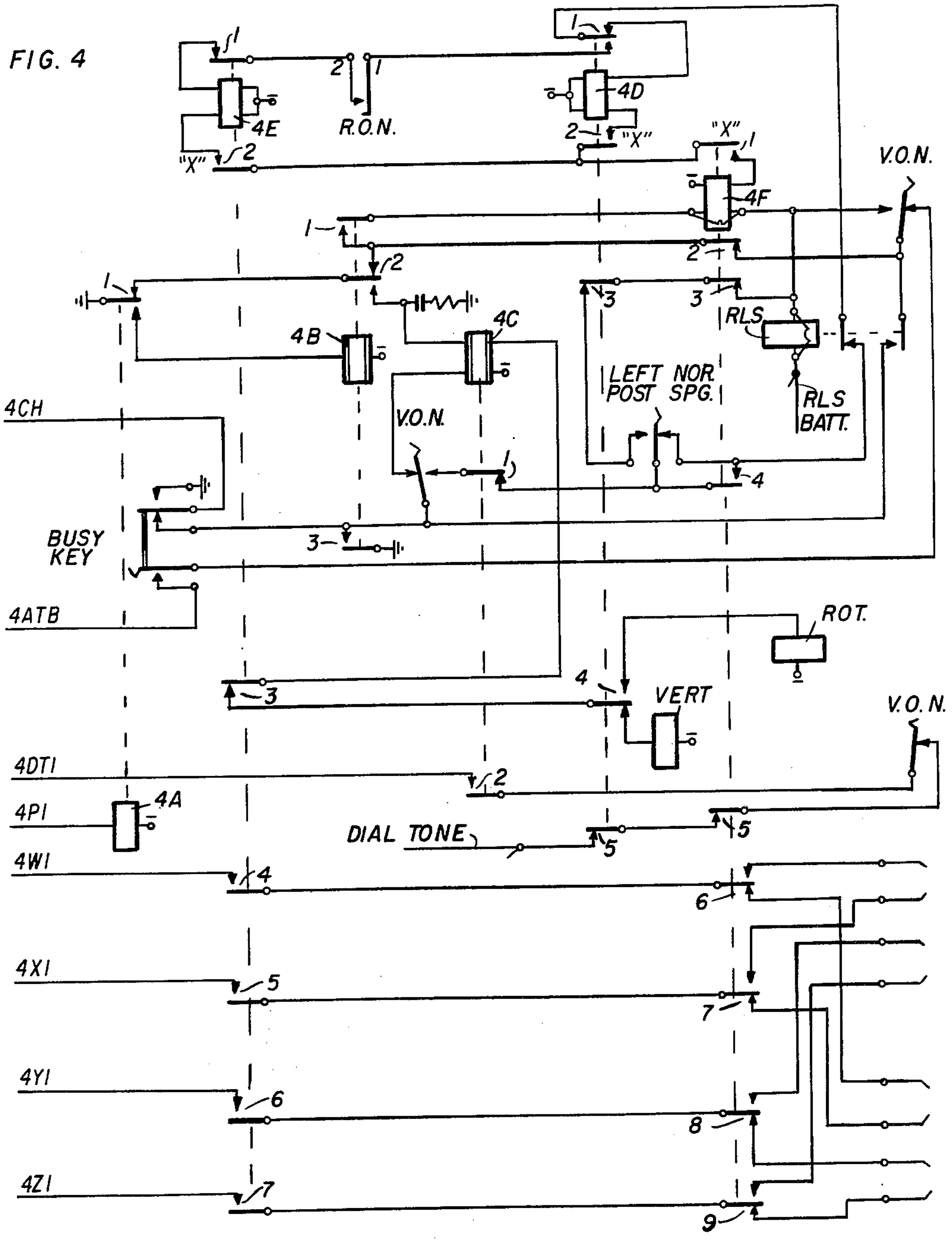
FIG. 4 illustrates the discriminator circuit.
Figure 5:
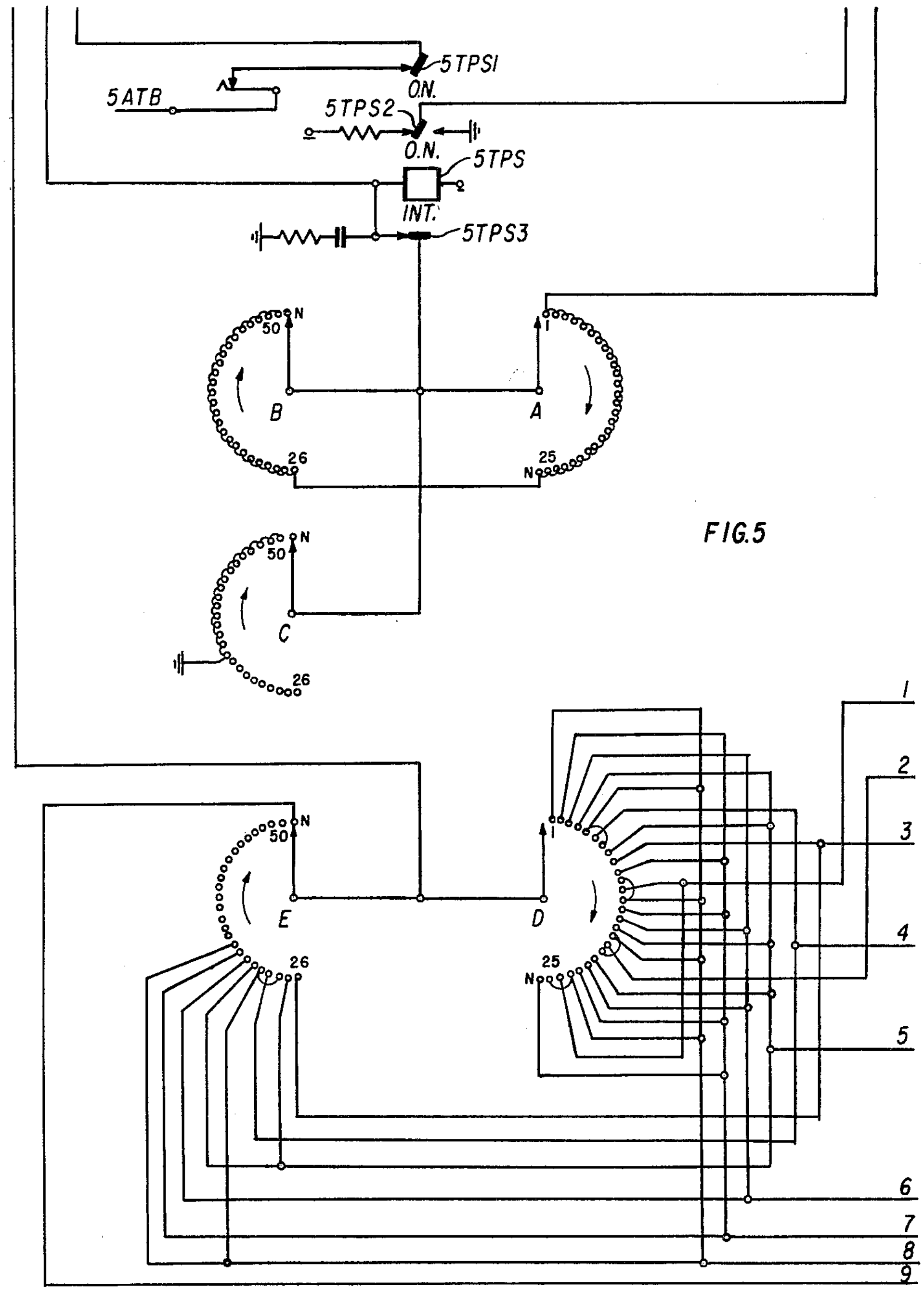
Figure 6:
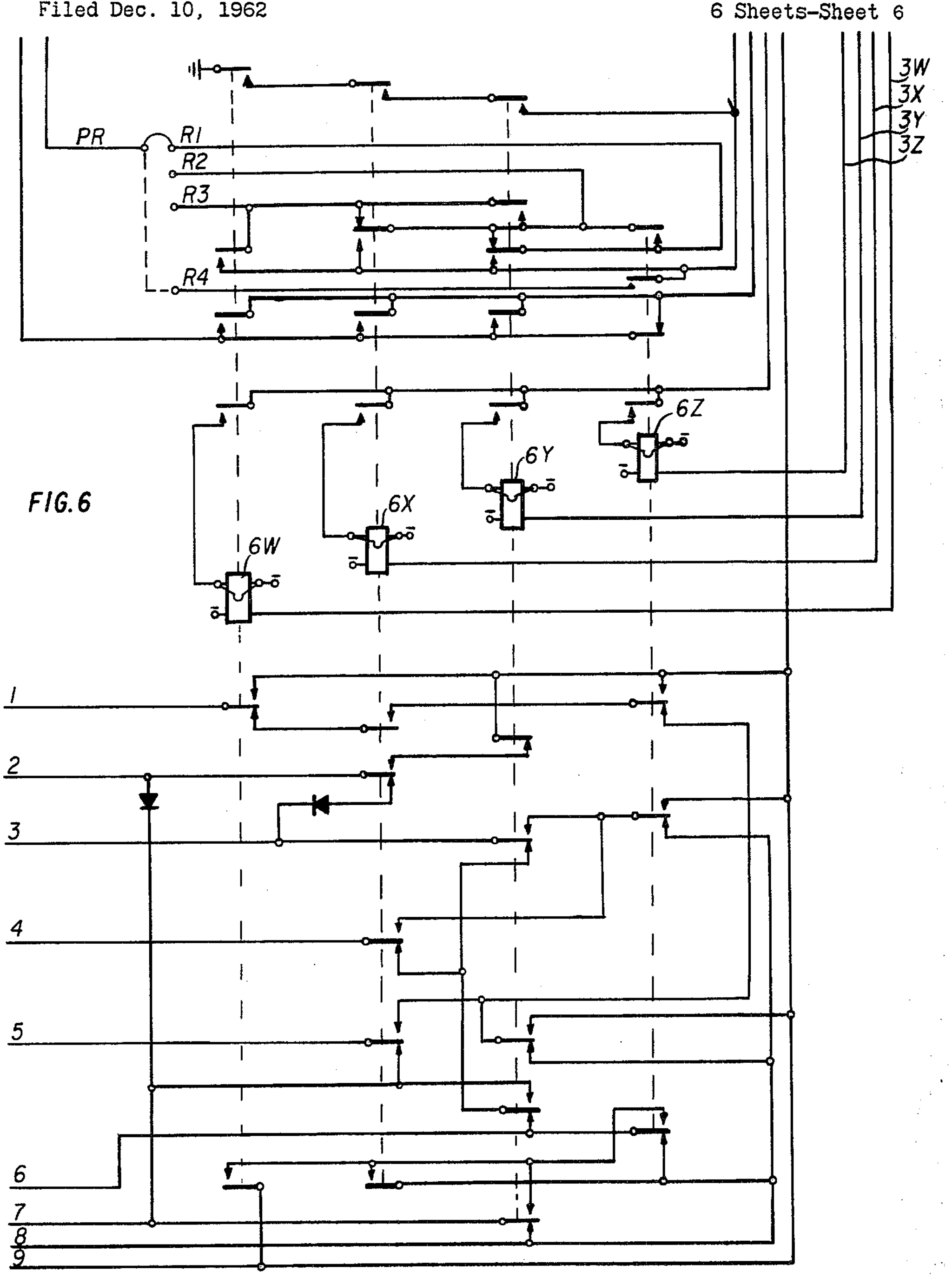

Ground on lead 2P from the trunk circuit closes an operating path for relay 3A register hunter (FIG. 3). Relay 3A operates its "X" contacts 3A3, closes an operating path to relay 3C via the interrupter springs 3RS1 and level A of rotary switch 3RS, and operates completely. Relay 3C operates and closes ground to the motor magnet of rotary switch 3RS, which operates and operates its interrupter springs 3RS1, which open the circuit to relay 3C. Relay 3C restores and opens the motor magnet of rotary switch 3RS which restores, steps its wipers one step, and restores its off normal and interrupter springs. This relay interrupted stepping continues until an idle register is found or until the 25th step is taken (All Registers Busy). When an idle register is found (absence of ground on lead 4CH), the shunt is removed from number one winding of relay 3B. Relay 3B operates, switch 3RS does not operate in series when relay 3B opens the circuit of relay 3A, and closes leads 3W, 3X, 3Y, 3Z, 2DT, and 2P to leads 4W1, 4X1, 4Y1, 4Z1, 4DT1, and 4P1, respectively, via their levels of rotary switch 3RS. Ground on lead 4P1 via level C of 3RS closes a circuit to relay 4A. Relay 4A operates, removes ground from lead 4ATB for a possible all trunks busy indication, and closes a circuit to relay 4B. Relay 4B operates, grounds lead 4CH to hold relay 3B in the register hunter operated and to mark this circuit busy, and closes a path to the second winding of relay 4C. After its slow to release interval, relay 3A restores. Relay 4C operates and closes lead DIAL TONE to lead 4DT1, signaling the calling party to begin dialing.

*Vertical stepping (operated: relays 3B, 4B, and 4C)*

TWO DIGIT DESTINATION CODE

As the pulses are received in the trunk circuit, ground is removed from relay 4A via leads 2P and 4P1. In this manner, relay 4A follows the pulses, and when at normal, opens the circuit of relay 4B, and closes the circuits to the first winding of relay 4C and the vertical magnet in series. The vertical magnet operates and steps its wipers to the desired level. On the first vertical step, the VON springs restore, open lead DIAL TONE, open the circuit to the second winding of relay 4C and prepare a path to the first winding of relay 4D. Relays 4B and 4C remain operated during pulsing due to their slow to release characteristics. At the completion of the digit, relay 4A re-operates, opens the circuit to the first winding of relay 4C and the Vertical magnet, and closes a circuit to relay 4B. The Vertical magnet restores. After its slow to release interval, relay 4C restores and closes a circuit to the first winding of relay 4D. Relay 4D operates and prepares a circuit to the ROTARY magnet.

THREE DIGIT DESTINATION CODE

If the first digit dialed is the prefix digit of the three digit destination code, operation is the same as described above except that the Left Normal Post Springs operate. At the completion of the digit, relay 4C restores and closes a circuit to the magnet 4RLS. The magnet 4RLS operates and restores the shaft to normal. When at normal, the VON springs operate, closing a circuit to the first winding of relay 4F and opening the 4RLS magnet circuit.

Relay 4F operates and transfers the codel leads 4W1, 4X1, 4Y1, and 4Z1 from the lower bank to the upper bank of the Strowger 2 motion switch and the 4RLS magnet restores.

When the second digit is dialed, operation is the same as described in the preceding section.

*Rotary stepping (operated: relays 3B, 4A, 4B, 4D, and possibly 4F)*

Relay 4A follows the pulses of the next digit, and when at normal, opens the circuit to relay 4B, and closes a circuit to the first winding of relay 4C and the 4 Rotary magnet in series. The 4 Rotary magnet operates and steps the wipers to the dialed bank contact. Relays 4B and 4C remain operated during pulsing due to their slow to release characteristics.

At the completion of the digit, relay 4A reoperates, closes the circuit to relay 4B, and opens the circuit to the first winding of relay 4C and the 4 Rotary magnet which restores.

*Switch through (operated: relays 3B, 4A, 4B, 4C, and possibly 4F)*

After its slow to release interval, relay 4C restores and closes a circuit to the first winding of relay 4E. Relay 4E operates, opens the path to relay 4C to prevent it from operating should additional pulses be received, and closes leads 2W1, 2X1, 2Y1 and 2Z1 to the lower bank (or upper bank if relay 4F is operated). In accordance with the table following this section, ground is returned from either the upper or lower bank via leads 2W1, 2X1, 2Y1, or 2Z1 to operate their respective relays in the trunk circuit.

| Time-Zone Meter Pulse in Seconds | Control Leads Grounded |
|---|---|
| 5 | 2W1—2X1 |
| 10 | 2W1—2Y1 |
| 15 | 2W1—2Z1 |
| 20 | 2X1—2Y1 |
| 30 | 2X1—2Z1 |
| 45 | 2Y1—2Z1 |
| 60 | 2W1 |
| 90 | 2X1 |
| 180 | 2Y1 |
| Spl. Srv | 2Z1 |
| No Code | 2W1—2X1—2Y1 |

*Release (operated: relays 3B, 4A, 4B, 4D, 4E, and possibly 4F)*

When the codel relays in the trunk circuit operate, ground is removed from lead 2P opening the circuit to relay 4A. Relay 4A restores and opens the circuit of relay 4B. After its slow to release interval, relay 4B restores, opens the circuits to the second winding or relays 4D, 4E and 4F (if operated), closes a path to the 4RLS magnet (if 4F is not operated), and removes ground from lead 4CH opening the circuit to the second winding of relay 3B and marking this circuit idle. Relay 3B restores and returns the register hunter to normal. Relay 4F restores (if operated) and closes a path to the 4RLS magnet. Relays 4E and 4D restore. The 4RLS magnet operates and returns the switch to normal. The vertical off-normal springs operate and open the 4RLS magnet operating path, which restores. The register is now at normal.

*All registers busy (operated: relays 3A and 3C)*

If all the registers are busy, rotary switch 3RD steps to bank contact 25. On the 25th rotary step, the off normal springs 3RS2 operate to prevent relay 3B from operating. Since ground is removed from all the ATB leads, rotary switch 3RS stops on bank contact 25 and remains there until a register becomes idle at which time, ground on lead 4ATB causes 3RS to step to bank contact number 1 and hunt for the idle register.

While the principles of the invention have been described above in connection with specific embodiments, and particular modifications thereof, it is to be clearly understood that this description is made only by way of example and not as a limitation on the scope of the invention.

What is claimed is:

1. In a toll service telephone system, a calling subscriber's line including a dial, a plurality of trunks, each of said trunks having a plurality of different tariff rate destinations accessible via them, means including automatic switches for setting up a toll connection from said line to one of said trunks, a meter for said line, a repeater circuit in said toll connection connected to said one of said trunk lines, a discriminator circuit, a rotary switch means operated by said repeater circuit upon access by said calling line to operatively associate said discriminator with said repeater circuit, repeating means in said repeater circuit operated during the establishment of the call therethrough to repeat dialed pulses to said trunk line and to said discriminator circuit via said rotary switch means, means in said discriminator circuit operated in accordance with said repeated pulses to return a tariff indication to said repeater and including a disconnect means operated thereafter, tariff indication recording means in said repeater operated by said tariff indication, a constant pulse source, a stepping switch means in said repeater operated by said pulse source upon completion of a connection, and, means mutually controlled by said stepping switch means and said operated tariff indication recording means to periodically send pulses to said subscriber meter in conformance with said recorded tariff indication.

2. In a toll service telephone system, a calling subscriber's line including a dial, and line equipment including a control conductor, a plurality of trunks, each of said trunks having a plurality of different tariff rate destinations accessible via them, means including automatic switches for setting up a toll connection from said line equipment to one of said trunks, a meter for said line equipment, said meter operated only upon application of a high voltage to said line equipment control conductor, a repeater circuit connected to each one of said trunks, a discriminator circuit, a rotary switch means operated by said repeater circuit upon access by said calling line to operatively associate said repeater circuit with said discriminator, repeating means in said repeater circuit operated during the establishment of a call therethrough to repeat dialed pulses to said trunk and to said discriminator circuit via said rotary switch means, means in said discriminator circuit operated in accordance with said repeated pulses to return a tariff indication to said repeater and including a disconnect means operated thereafter, and tariff indication recording means in said repeater operated by said tariff indication, a constant pulse source, a stepping switch means in said repeater operated by said pulse source upon completion of a connection via said associated trunk, and means mutually controlled by said stepping switch means and said operated tariff indication recording means to periodically send high voltage pulses to said line equipment via said control conductor to operate said subscriber meter in conformance with said recorded tariff indication.

3. In a toll service telephone system, a plurality of stations including a calling station each having a calling device a line and subscriber line equipment including control conductors, a plurality of trunks, each of said trunks having a plurality of different tariff rate destinations accessible via them, means including automatic switches operated by said calling device for setting up a toll connection from said calling station to one of said trunks, a meter for said line equipment, said meter operated only upon application of a high voltage to said line equipment control conductor, a repeater circuit for each of said trunk lines, a discriminator circuit, discriminator allotter means to step to an available discriminator circuit, discriminator calling means in said repeater operated upon access of said calling station via said switching equipment to operate said discriminator allotter to connect said repeater circuit with said discriminator via a first inpulsing path and a second tariff code receiving path, repeating means in said repeater circuit operated during the establishment of a call therethrough to repeat dialed pulses from said calling station calling device to said trunk line and to said discriminator circuit via said discriminator allotter, said discriminator including a two motion switch mechanism having vertical off normal springs, a plurality of contact wipers and a contact bank assembly, said contacts wired in groups corresponding to said wiper positions to present a tariff code indicative of the tariff rate for each available setting of said wipers, each said group engageable by said plurality of wipers, said two motion switch mechanism operated in accordance with said repeated pulses to selectively absorb the first digit repeated thereto as indicated by the vertical and off-normal springs and to select a bank position corresponding to the subsequent two of the three digits repeated thereto, and means comprising the strapping on said bank assembly, said plurality of wipers and said discriminator allotter to connect an appropriate tariff code to said repeater via said second tariff code receiving path, tariff code recording means in said repeater including a plurality of code relays corresponding to the bits of the tariff code operated by said tariff indication code, said relays each having a plurality of decoding contact springs operated thereby, a constant pulse source, a rotary switch including a bank assembly in said repeater operated by said pulse source upon completion of a connection via said associated trunk, and selective tariff rate pulse sending means comprising the strapping of said rotary switch banks by said operated code relay decoding contact springs scanned by said rotary switch operated by said pulsing means to send an appropriate sequence of high voltage pulses to said line equipment via said control conductor to operate said subscriber meter.

References Cited by the Examiner

UNITED STATES PATENTS

| | | | |
|---|---|---|---|
| 1,862,536 | 6/1932 | Hartley et al. | 179—9 |
| 1,901,940 | 3/1933 | Wright | 179—9 |
| 2,457,946 | 1/1949 | Taylor et al. | 179—9 |
| 2,885,481 | 5/1959 | Lomax | 179—18 |

ROBERT H. ROSE, *Primary Examiner.*

WALTER L. LYNDE, *Examiner.*

H. BOOHER, H. ZELLER, *Assistant Examiners.*